United States Patent [19]

Kawase et al.

[11] Patent Number: 4,699,419
[45] Date of Patent: Oct. 13, 1987

[54] STRUCTURE FOR CONNECTING FRONT PILLAR AND COWL IN VEHICLE

[75] Inventors: Yukio Kawase; Hitoshi Izuta, both of Aichi, Japan

[73] Assignee: Toyota Jidosha Kabushiki Kaisha, Japan

[21] Appl. No.: 875,991

[22] Filed: Jun. 19, 1986

[30] Foreign Application Priority Data

Jul. 3, 1985 [JP] Japan ................. 60-146270
Jul. 3, 1985 [JP] Japan ................. 60-146271

[51] Int. Cl.$^4$ ............................................. B62D 27/00
[52] U.S. Cl. ................................. 296/192; 296/194; 296/188
[58] Field of Search ............... 296/192, 194, 185, 202, 296/188

[56] References Cited

U.S. PATENT DOCUMENTS

| 4,078,840 | 3/1978 | Itoh | 296/192 |
| 4,270,793 | 6/1981 | Harasaki et al. | 296/192 |
| 4,332,187 | 6/1982 | Imai et al. | 296/192 |
| 4,545,612 | 10/1985 | Harasaki | 296/192 |

FOREIGN PATENT DOCUMENTS

26055 2/1982 Japan ....................... 296/192

Primary Examiner—Robert R. Song
Attorney, Agent, or Firm—Parkhurst & Oliff

[57] ABSTRACT

A structure for connecting front pillars and a cowl in a vehicle has a cowl assembly including a cowl inner which extends in the lateral direction of the vehicle, a pair of front pillar assemblies provided so as to stand at two lateral ends, respectively, of the vehicle and each including an outer member and an inner member with respect to the lateral direction of the vehicle; and a pair of cowl side panels for connecting the cowl assembly and the pair of front pillar assemblies. A reinforcing means is rigidly secured to the outer and inner members of each of the front pillar assemblies so as to be stretched between these members, thereby partitioning a space with a closed section defined by the two members. The reinforcing member extends from the corresponding front pillar assembly either inwardly in the lateral direction of the vehicle or toward the front end of the vehicle so as to be further connected to the cowl assembly.

16 Claims, 17 Drawing Figures

STRUCTURE FOR CONNECTING FRONT PILLAR AND COWL IN VEHICLE

BACKGROUND OF THE INVENTION

1. Field of the Invention

The present invention relates to a structure for connecting front pillars and a cowl in a vehicle such as an automobile.

2. Description of the Related Art

The body of an automobile is provided with two front pillars which respectively stand at two lateral ends thereof and are connected to a cowl disposed so as to extend in the lateral direction of the vehicle body.

In a typical conventional structure for connecting front pillars and a cowl in an automobile, the front part of each front pillar in the longitudinal direction of the vehicle body and the rear part of the cowl in the same direction are connected together through a cowl side panel. In this connecting structure, the joint between the front pillar and the cowl side panel and the joint between the cowl and the cowl side panel are spaced apart from each other in the longitudinal direction of the vehicle. Therefore, the rigidity of each joint is relatively low, and the torsional rigidity as well as the flexural rigidity of the body are also relatively low, disadvantageously. In order to improve these rigidities, it is necessary, for example, to provide reinforcing means and increase the thickness of the panel. These means lead, however, to an increase in the overall weight and a rise in costs, which means that the efficiency is low; therefore, it is not preferable to adopt such means.

Japanese patent Laid-Open No. 53570/1983 proposes a connecting structure in which a cowl inner is connected directly to each front pillar. However, in this connecting structure also, improvements in the rigidity of the joint and the torsional rigidity as well as the flexural rigidity of the body are limited. There has been therefore a demand for a structure for connecting front pillars and a cowl which enables these rigidities to be further improved.

In addition, a front door is supported by a front pillar, which means that the front pillar is subjected to torsional force when the front door is opened and closed. For this reason, it is necessary to improve the torsional rigidity of the front pillar so as to prevent deformation of the cross-sectional configuration of the front pillar. Examples of such front pillar structure includes those proposed in Japanese Utility Model Laid-Open No. 188375/1983, Japanese Utility Model Publication No. 17251/1981 and Japanese patent Laid-Open No. 36769/1983.

SUMMARY OF THE INVENTION

In view of the above-described circumstances, it is a primary object of the present invention to provide a structure for connecting front pillars and a cowl in a vehicle which enables a substantial improvement in the rigidity of bond between the front pillars and the cowl and hence improvements in the torsional rigidity as well as the flexural rigidity of the vehicle body and which also permits the torsional rigidity of the front pillars to be improved.

To this end, the present invention provides a structure for connecting front pillars and a cowl in a vehicle, comprising: a cowl assembly extending in the lateral direction of the vehicle; a pair of front pillar assemblies provided so as to stand at two lateral ends, respectively, of the vehicle and each including an outer member and an inner member with respect to the lateral direction of the vehicle; and a pair of cowl side panels for connecting the cowl assembly and the pair of front pillar assemblies, characterized in that there is provided reinforcing means rigidly secured to the outer and inner members of each of the front pillar assemblies so as to be stretched between these members, thereby partitioning a space with a closed section defined by the two members.

BRIEF DESCRIPTIN OF THE DRAWINGS

FIGS. 1 to 5 show the joint portion between a front pillar and a cowl in an automobile to which one embodiment of the connecting structure according to the present invention is applied, in which:

FIGS. 10 to 15 show the joint portion between a front pillar and a cowl in an automobile to which a fourth embodiment of the connecting structure according to the present invention is applied, in which:

DETAILED DESCRIPTION OF THE PREFERRED EMBODIMENTS

FIGS. 1 to 5 show the joint portion between a front pillar and a cowl in an automobile to which a first embodiment of the connecting structure according to the present invention is applied. Front pillar and cowl connecting structures according to the present invention are respectively provided at two lateral ends of the vehicle body, and they are basically symmetrical with each other with respect to the longitudinal axis of the vehicle body. Therefore, the connecting structure provided on the left-hand side of the vehicle body alone is shown in the drawings. In the figures, the directions of the arrows A, B and C respectively represent the longitudinal, lateral and heightwise directions of the vehicle body.

Figure 1:
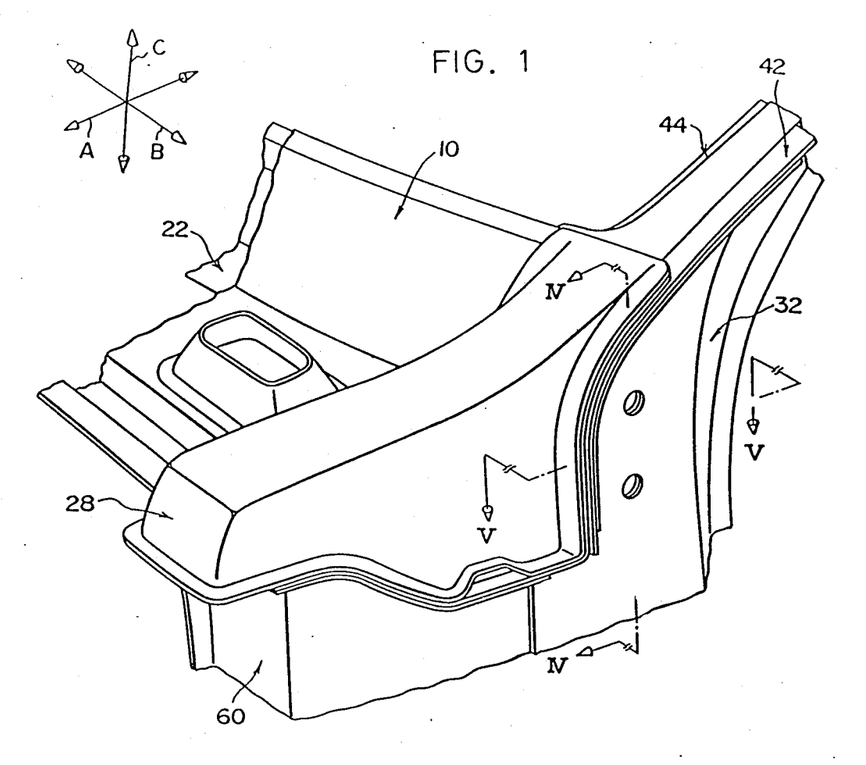
FIG. 1 is a perspective view showing the external appearance of the joint portion.
Figure 2:
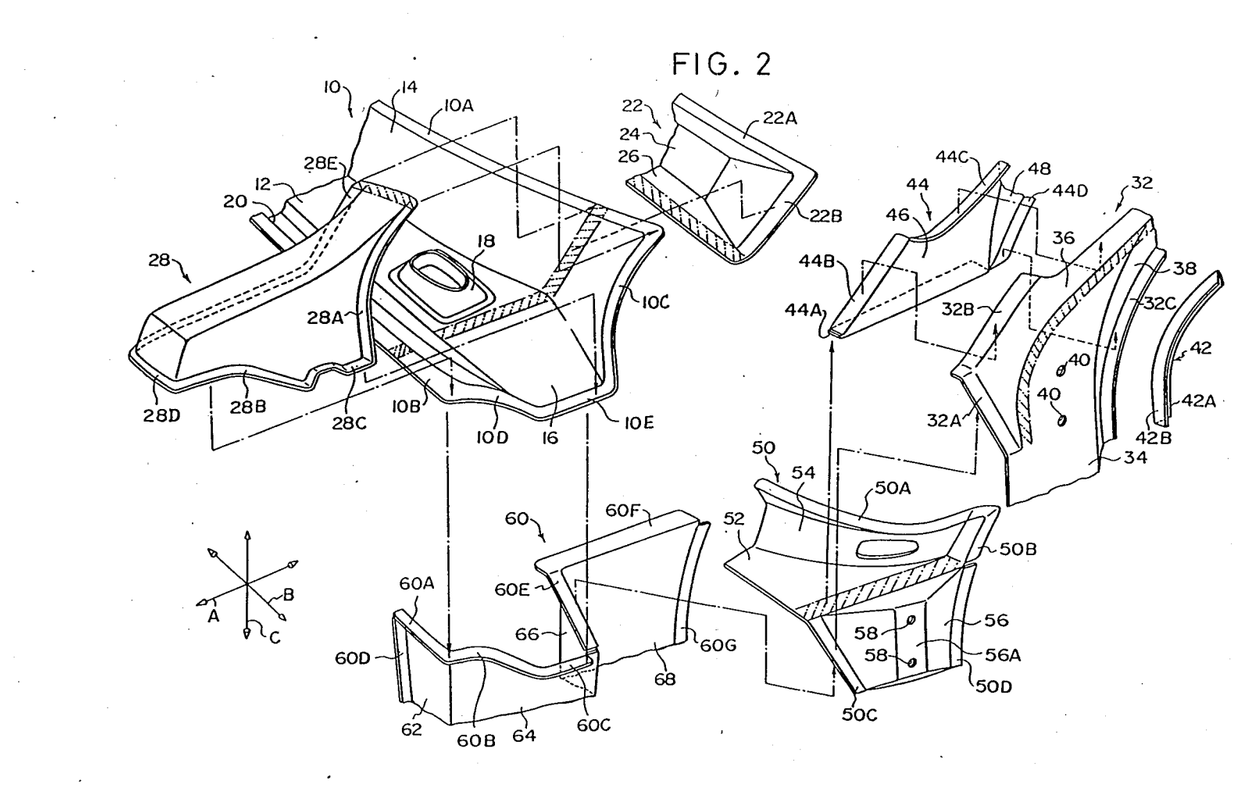
FIG. 2 is an exploded perspective view of the joint portion.

As shown in FIG. 1, a cowl inner 10 is disposed so as to extend in the lateral direction of the vehicle body. The cowl inner 10 has, as shown in FIG. 2, a horizontal portion 12 and a rising portion 14 which rises from the end of the horizontal portion 12 which is closer to the rear end of the vehicle body while slanting rearwardly. One lateral end portion of the horizontal portion 12 is slanted downwardly toward the outside in the lateral direction of the vehicle body, thereby providing a slanting portion 16. The horizontal portion 12 is further provided with a raised portion 18 having an opening in the center thereof, and a groove 20 which extends in the lateral direction of the vehicle body. The opening in the raised portion 18 is communicated with an air duct which opens into the compartment.

Along the periphery of the cowl inner 10 are continuously formed an upper flange 10A, a front flange 10B, a side rear flange 10C which extends downwardly from the upper flange 10A while convexly bending toward the front end of the vehicle body (toward the left-hand side as viewed in FIG. 2), a side front flange 10D which extends downwardly from the front flange 10B while convexly bending toward the rear end of the vehicle body, and a side central flange 10E which is positioned intermediate between the side rear and front flanges 10C and 10D.

As shown in FIG. 3(A), a cowl inner reinforcing member 22 is welded to the reverse surface of the cowl inner 10 so as to extend in the lateral direction of the vehicle body. The cowl inner reinforcing member 22 has, as shown in FIG. 2, upper and side flanges 22A, 22B which are continuous with each other and a raised portion 24 which is projected from the plane of the flanges 22A, 22B toward the rear end of the vehicle body.

The cowl inner reinforcing member 22 has a horizontal portion 26, and the upper surface of the front end portion (the portion shown by the parallel diagonal chain lines in FIG. 2) of the horizontal portion 26 is welded to the reverse surface of the horizontal portion 12 of the cowl inner 10 is shown in FIG. 3(A). The upper flange 22A is welded to the reverse surface of the upper flange 10A of the cowl inner 10, and the side flange 22B is welded to the reverse surface (the reverse surface of the portion shown by the parallel diagonal chain lines in FIG. 2) of the rising portion 14 of the cowl inner 10. Thus, the cowl inner reinforcing member 22 defines a space with a closed section between the raised portion 24 and the rising portion 14 of the cowl inner 10, the space being closed along the entire periphery thereof.

As shown in FIG. 2, a cowl side reinforcing member 28 has the shape of a box whose bottom and rear side (the side which is closer to the rear end of the vehicle body) are open. Along the outer (in the lateral direction of the vehicle body) periphery of the lower end of the cowl side reinforcing member 28 are continuously formed a side rear flange 28A which extends downwardly while convexly bending toward the front end of the vehicle body, a side front flange 28B which extends downwardly while convexly bending toward the rear end of the vehicle body, and a side central flange 28C which is positioned intermediate between the side rear and front flanges 28A, 28B and which convexly bends toward the the upper side of the vehicle body.

In addition, a front flange 28D is formed so as to be continuous with the side front flange 28B, and a side flange 28E is formed along the inner (in the lateral direction of the vehicle body) periphery of the lower end of the cowl side reinforcing member 28 in such a manner that the side flange 28E is continuous with the front flange 28D. The side flange 28E is bent so that a portion of the side flange 28E on the side thereof which is closer to the rear end of the vehicle body extends obliquely upward toward the rear end of the vehicle body.

The cowl side reinforcing member 28 is welded to the upper flange 10A of the cowl inner 10 at the reverse surface of the rear end portion thereof (the portion shown by the parallel diagonal chain lines in FIG. 2) as shown in FIG. 3(A). The reverse surfaces of the side rear, central and front flanges 28A, 28C and 28B are respectively welded to the side rear, central and front flanges 10C, 10E and 10D of the cowl inner 10. In addition, the reverse surface of the side flange 28E is welded to respective portions (shown by the parallel diagonal chain lines in FIG. 2) of the upper flange 10A, the rising portion 14, the horizontal portion 12 and the front flange 10B of the cowl inner 10. The cowl side reinforcing member 28 cooperates with the cowl inner 10 to define a space with a closed section.

Prior to the mounting on the vehicle body, the cowl inner 10, the cowl inner reinforcing member 22 and the cowl side reinforcing member 28 are welded together as described above to form a cowl subassembly 30 shown in FIG. 3(A).

As shown in FIG. 1, a front pillar outer 32 is provided so as to stand at one lateral end of the vehicle body. The front pillar outer 32 is, as shown in FIG. 2, bent so that a pillar upper portion 36 and a pillar outer portion 38 extend from a door hinge mounting portion 34 inwardly in the lateral direction of the vehicle body. Hinge mounting bores 40 are provided in the door hinge mounting portion 34. The pillar upper portion 36 is provided with a front flange 32A which extends inwardly in the lateral direction of the vehicle body while defining an up-grade, and an upper flange 32B which is continuous with the front flange 32A and extends rearwardly in the longitudinal direction of the vehicle body while defining an up-grade. A lower flange 32C is formed at the lower end of the pillar outer portion 38.

As shown in FIG. 2, a roof drip channel 42 has a substantially L-shaped cross-section and is bent at the lower end portion so as to form a circular portion. The roof drip channel 42 is welded at one surface 42A thereof to respective portions (the portions shown by the parallel diagonal chain lines in FIG. 2) of the door hinge mounting portion 34 and the pillar outer portion 38 of the front pillar outer 32 which are adjacent to the pillar upper portion 36. The other surface 42B rises from the respective surfaces of the door hinge mounting portion 34 and the pillar outer portion 38 as shown in FIG. 3(B).

A front pillar inner 44 is, as shown in FIG. 2, provided with a pillar inner portion 46 and a pillar lower portion 48 which is bent so as to extend outwardly in the lateral direction of the vehicle body from the end of the pillar inner portion 46 which is closer to the rear end of the vehicle body. The pillar inner portion 46 has a lower flange 44A provided at the lower end thereof so as to extend inwardly in the lateral direction of the vehicle body, a front flange 44B provided at the front end thereof so as to extend inwardly in the lateral direction of the vehicle body, and an upper flange 44C provided at the upper end thereof so as to extend outwardly in the lateral direction of the vehicle body. The pillar lower portion 48 has a rear flange 44D provided at the end thereof which is closer to the outside of the vehicle body.

The front pillar inner 44 is connected to the front pillar outer 32 in such a manner that, as shown in FIG. 3(B), the front flange 44B is welded to the reverse surface of the upper flange 32B of the front pillar outer 32, while the upper flange 44C is welded to the reverse surface of the pillar upper portion 36 of the front pillar outer 32 and the rear flange 44D is welded to the reverse surface of the lower flange 32C of the front pillar outer 32. Thus, the front pillar inner 44 cooperates with the front pillar outer 32 to define a space having a closed section.

A door hinge reinforcing member 50 is, as shown in FIG. 2, provided with a horizontal portion 52, a rising portion 54 which rises from the rear end of the horizontal portion 52 and which is bent so that the inner (in the lateral direction of the vehicle body) end portion of the rising portion 54 extends toward the front end of the vehicle body, and a side portion 56 which is bent so as to extend downwardly from the laterally outer end of the horizontal portion 52. The rising portion 54 has an upper flange 50A and a side upper flange 50B which are continuous with each other.

The central portion (in the longitudinal direction of the vehicle body) of the side portion 56 is raised outwardly in the lateral direction of the vehicle body, and door hinge mounting bores 58 are provided in the top 56A of the side portion 56. Weld nuts 59 (see FIGS. 4 and 5) are rigidly secured to the respectively peripheries of the door hinge mounting bores 58. The side portion 56 is provided at the front end thereof with a side front flange 50C which extends inwardly in the lateral direction of the vehicle body while defining an upgrade. A side rear flange 50D is provided at the rear end of the side portion 56 so as to extend substantilly vertically.

The door hinge reinforcing member 50 is connected to the front pillar inner 44 in such a manner that a portion (the portion shown by the parallel diagonal chain lines in FIG. 2) of the horizontal portion 52 which is adjacent to the side portion 56 is welded to the reverse surface of the lower flange 44A of tne front pillar inner 44 as shown in FIG. 3(B). In addition, the side upper flange 50B is welded to the reverse surface of the rear flange 44D of the front pillar inner 44, while the side front flange 50C is welded to the reverse surface of the front flange 32A of the front piller outer 32, and the side rear flange 50D is welded to the reverse surface or the lower flange 32C of the front pillar outer 32. The top 56A is brought into contact with the reverse surface of the door hinge mounting portion 34 of the front pillar outer 32, and the door hinge mounting bores 58 are respectively aligned with the door hinge mounting bores 40 provided in the front pillar outer 32.

A cowl side panel 60 is, as shown in FIG. 2, provided with a channel section portion defined by a front wall 62, a front side wall 64 and a central wall 66, and a rear side wall 68 which is bent at the distal end of the central wall 6 so as to extend toward the rear end of the vehicle body. A front flange 60A is provided on the upper end of the channel section portion in such a manner that the front flange 60A extends from the front wall 62 towards the front end of the vehicle body. The front side wall 64 is provided on the upper end thereof with a side front flange 60B which is continuous with the front flange 60A and which extends downwardly while convexly bending toward the rear end of the vehicle body, and a horizontal side central flange 60C which is continuous with the side front flange 60B. A front end flange 60D is formed at the inner end (in the lateral direction of the vehicle body) of the front wall 62.

A central flange 60E is formed on the upper end of the central wall 66 in such a manner as to extend toward the front end of the vehicle body. A rear flange 60F is formed on the upper end of the rear wall 60 in such a manner that the rear flange 60F is continuous with the central flange 60E and extends inwardly in the lateral direction of the vehicle body. In addition, a rear end flange 60G is formed at the end of the rear wall 68 which is closer to the rear end of the vehicle body.

The cowl side panel 60 is connected to the door hinge reinforcing member 50 in such a manner that the rear flange 60F is welded to the reverse surface of a portion (the portion shown by the parallel diagonal chain lines in FIG. 2) of the horizontal portion 52 which is adjacent to the side portion 56, as shown in FIG. 3(B). In addition, the central flange 60E is welded to the reverse surface of the side front flange 50C of the door hinge reinforcing member 50, and the rear end flange 60G is welded to the reverse surface of the side rear flange 50D of the door hinge reinforcing member 50 as well as the reverse surface of the lower flange 32C of the front pillar outer 32. Further, an end portion of the front side wall 64 which is closer to the rear end of the vehicle body is welded to the reverse surface of an end portion of the door hinge mounting portion 34 of the front pillar outer 32 which is closer to the front end of the vehicle body. Thus, the cowl side panel 60 cooperates with the front pillar outer 32 to define a space having a closed section with the door hinge reinforcing member 50 interposed therebetween.

Figure 3:
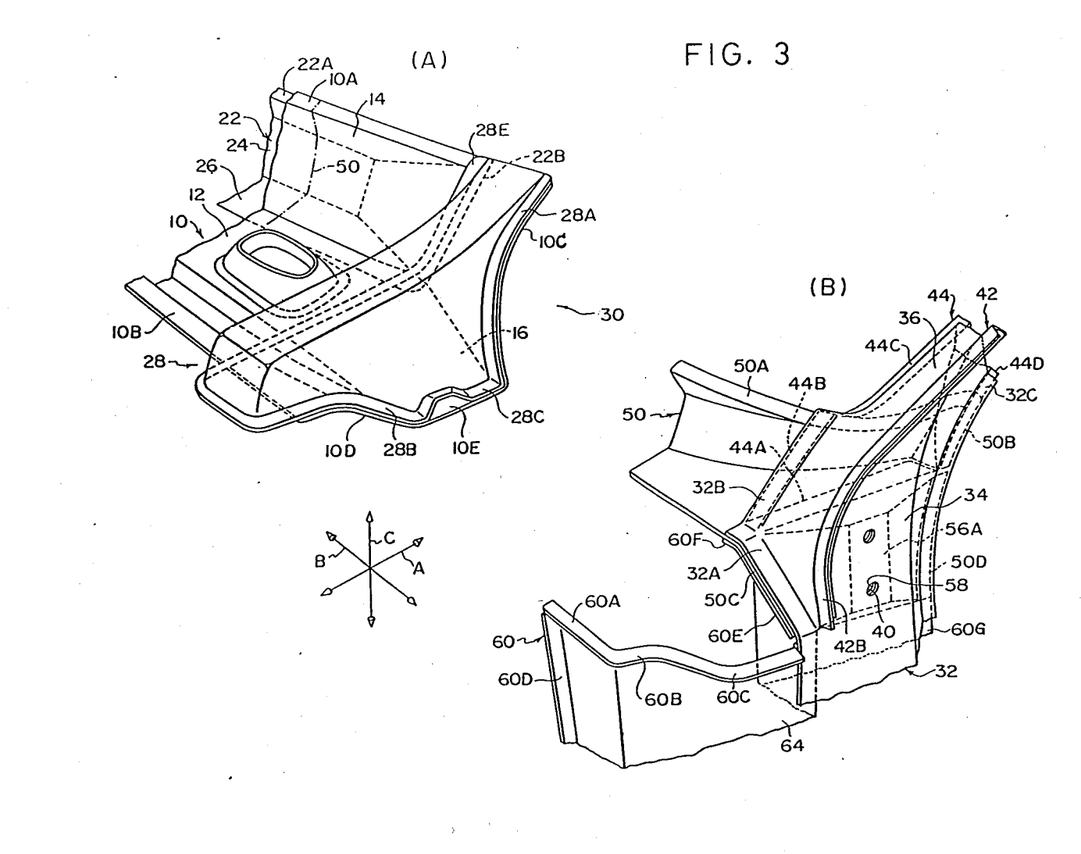
FIGS. 3(A) and 3(B) are perspective views showing the external appearance of the joint portion before the final assembly.

The cowl subassembly 30 shown in FIG. 3 (A) is connected to the cowl side panel 60 in such a manner that the reverse surface of the side central flange 10E of the cowl inner 10 is welded to the side central flange 60C of the cowl side panel 60, while the reverse surface of the side front flange 10D of the cowl inner 10 is welded to the side front flange 60B of the cowl side panel 60, and the reverse surface of the front flange 10B of the cowl inner 10 is welded to the front flange 60A of the cowl side panel 60.

The cowl inner reinforcing member 22 is connected to the door hinge reinforcing member 50 and the front pillar outer 32 in such a manner that the reverse surface of the upper flange 22A is welded to the upper flange 50A of the door hinge reinforcing member 50, while the reverse surface of the side flange 22B is welded to the upper flange 32B of the front pillar outer 32, and the reverse surface of the horizontal portion 26 is welded to the horizontal portion 52 of the door hinge reinforcing member 50. In addition, the reverse surface of the rear end portion of the slanting portion 16 of the cowl inner 10 is welded to the front flange 32A of the front pillar outer 2.

Figure 4:
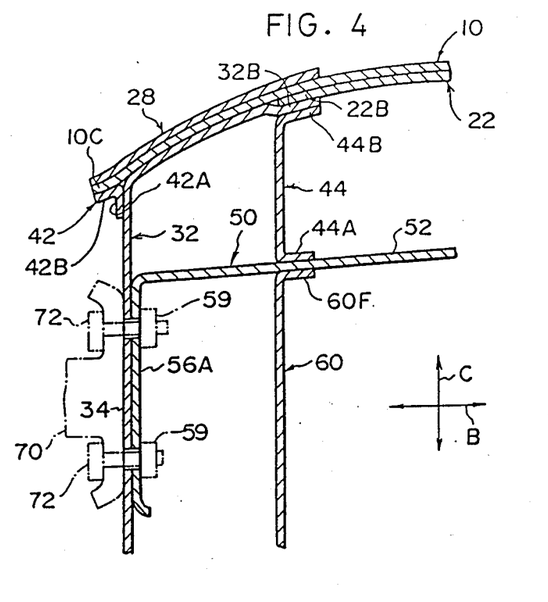
FIG. 4 is a sectional view taken along the line IV—IV in FIG. 1.
Figure 5:
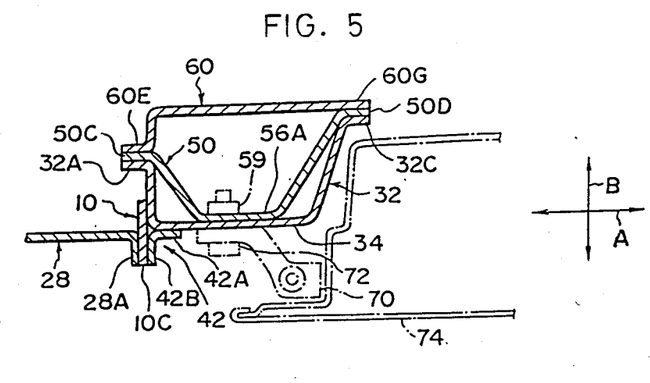
FIG. 5 is a sectional view taken along the line V—V in FIG. 1.

Further, the reverse surface of the side rear flange 10C of the cowl inner 10 is welded to the other surface 42B of the roof drip channel 42 as shown in FIGS. 4 and 5, whereby the cowl and the front pillar are connected together as shown in FIG. 1.

The door hinge mounting portion 34 of the front pillar outer 32 and the top 56A of the door hinge reinforcing member 50 which is in contact with the reverse surface of the door hinge mounting portion 34 are rigidly secured to each other by means of weld nuts 59 and mounting bolts 72 when a door hinge 70 is mounted, as shown in FIGS. 4 and 5. A front door 74 is pivotally supported by the door hinge 70 as shown in FIG. 5.

In this embodiment arranged as detailed above, the front pillar outer 32 and the front pillar inner 44 cooperate with each other to define the upper space portion of the front pillar having a closed section, and the front pillar outer 32 and the cowl side panel 60 cooperate with each other to define the lower space portion of the front pillar having a closed section, as shown in FIG. 4. The door hinge reinforcing member 50 is positioned between the upper and lower space portions of the front pillar in such a manner as to cross the space inside the front pillar, thus serving as a bulkhead which partitions the upper and lower space portions of the front pillar. The door hinge reinforcing member 50 extends inwardly in the lateral direction of the vehicle body from the joint between the same and the front pillar. The door hinge reinforcing member 50 is connected at the other end thereof to the cowl subassembly 30 through the roof drip channel 42.

Accordingly, the front pillar and the cowl are connected together linearly in the lateral direction of the vehicle body, and the door hinge reinforcing member 50 is connected to both of them at a multiplicity of positions in different directions and over relatively wide areas. Therefore, the rigidity of bond between the front pillar and the cowl is extremely high, and the torsional rigidity of the vehicle body is also considerably high. Thus, it is possible to obtain various advantages such as improvements in the vehicle body vibration characteristics and improvements in the vehicle controlling stability.

Since the door hinge reinforcing member 50 is disposed so as to cross the space inside the front pillar and connected to the cowl, the torsional rigidity of the front pillar is greatly improved, and the rigidity of the door hinge mounting portion 34 is also improved, whereby the cross-sectional deformation of the front pillar is prevented, and lowering of the door is thereby prevented.

In addition, since the door hinge reinforcing member 50 is connected to the cowl, when the door is in a closed state, the door itself greatly contributes to an improvement in the rigidity of the vehicle body.

Figure 6:
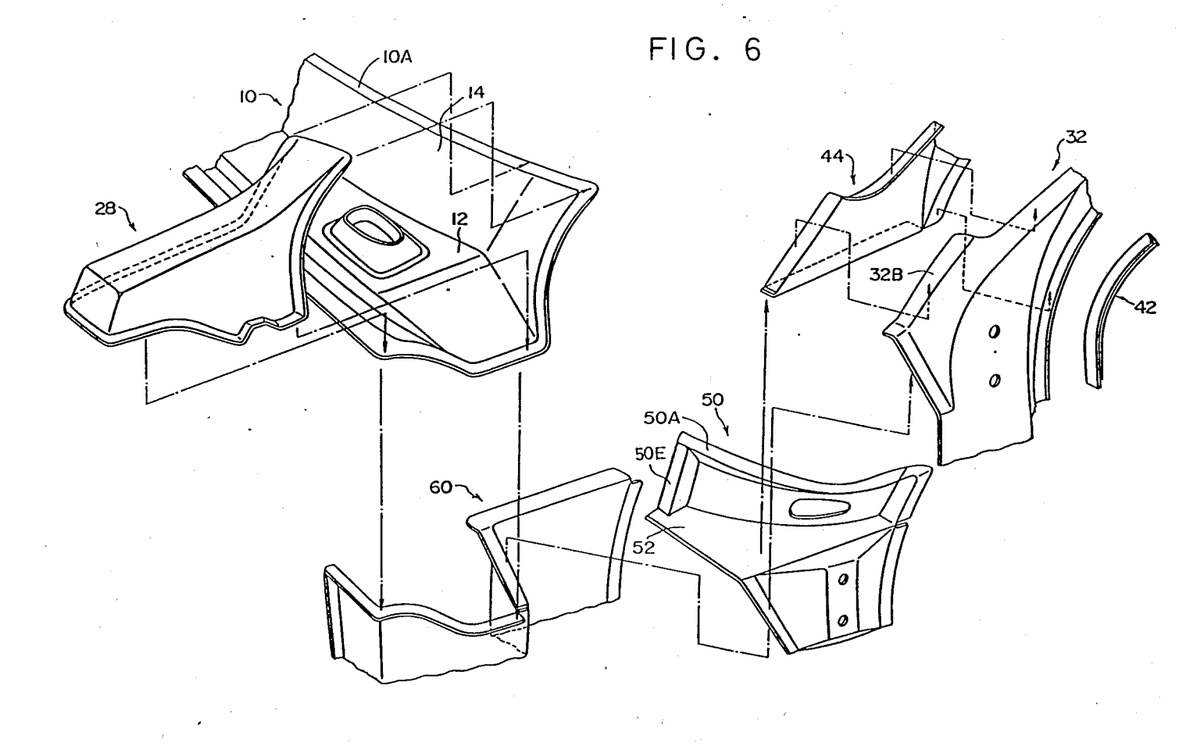
FIG. 6 is an exploded perspective view of a second embodiment of the present invention.

FIG. 6 is an exploded perspective view of a second embodiment of the present invention. In this embodiment, the cowl inner reinforcing member 22 is omitted, and the configuration of the door hinge reinforcing member 50 is partially modified. In consequence the connection relationship between the members is somewhat different from that in the first embodiment. However, the members in this embodiment which have the same configurations as those of the members in the first embodiment basically have the same connection relationships.

The second embodiment differs from the first embodiment in the following points. Namely, the configuration of the inner end portion of the door hinge reinforcing member 50 is partially modified, and a flange 50E is additionally provided. The front end portion of the horizontal portion 52 of the door hinge reinforcing member 50 is welded to the reverse surface of the rear end portion of the horizontal portion 12 of the cowl inner 10 rather than to the reverse surface of the horizontal portion 26 of the cowl inner reinforcing member 22. The upper flange 50A of the door hing reinforcing member 50 is welded to the reverse surface of the upper flange 10A of the cowl inner 10 rather than to the reverse surface of the upper flange 22A of the cowl inner reinforcing member 22. The upper flange 32B of the front pillar outer 32 is welded to the reverse surface of the rising portion 14 of the cowl inner 10 rather than to the reverse surface of the side flange 22B of the cowl inner reinforcing member 22. In addition, the flange 50E is welded to the reverse surface of the horizontal portion 12 of the cowl inner 10.

It should be noted that, since each of the members shown in FIG. 6 has basically the same configuration as that of the corresponding member shown in FIG. 2, only the reference numerals which generatlly denote respective members are shown except for the essential part of this embodiment in which it differs from the first embodiment, and the reference numerals for the details are not shown in FIG. 6.

In this embodiment, since the cowl inner reinforcing member 22 is omitted, the rigidity of the cowl is lowered correspondingly as compared with the first embodiment. However, the overall weight of the structure is reduced advantageously, and it is, of course, possible to obtain advantages similar to those explained in the first embodiment in comparison with the conventional structure.

Figure 7:
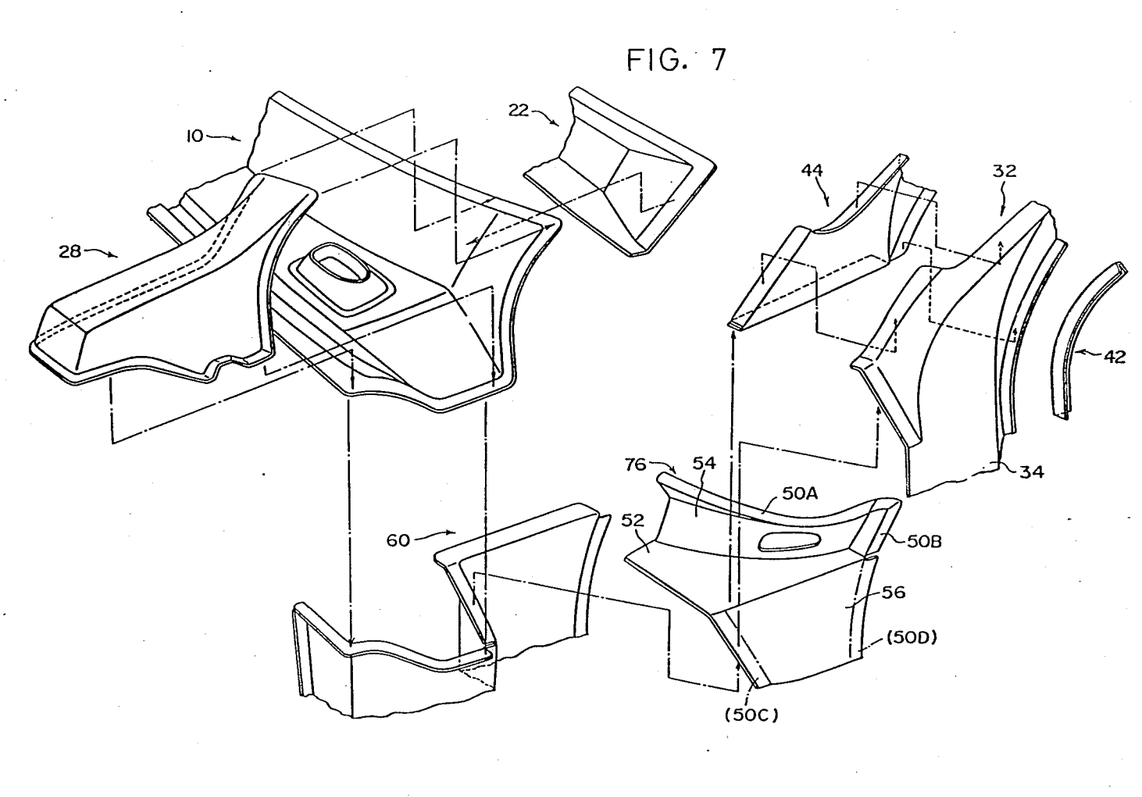
FIG. 7 shows a third embodiment of the present invention.
Figure 8:
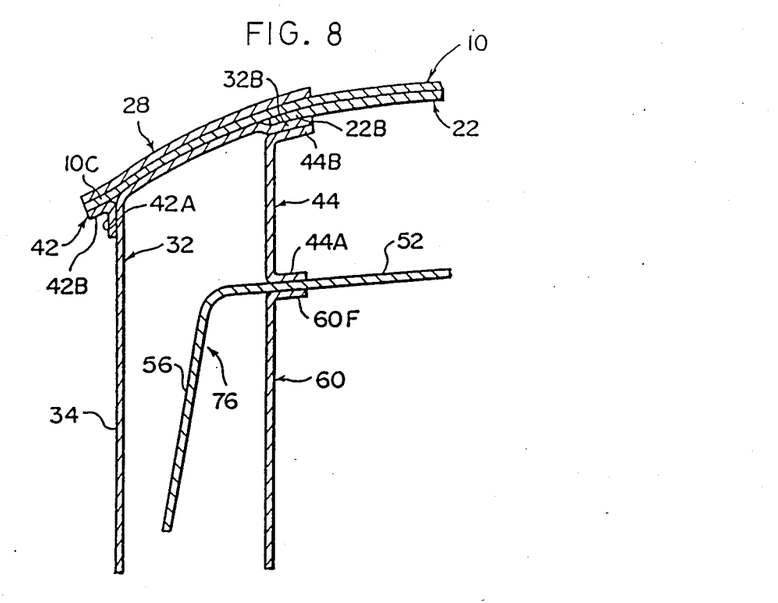
FIG. 8 is a sectional view of the third embodiment, which corresponds to FIG. 4.
Figure 9:
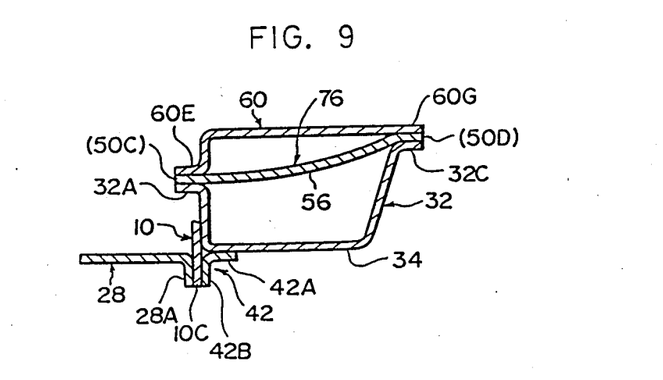
FIG. 9 is a sectional view of the third embodiment, which corresponds to FIG. 5.

FIGS. 7 to 9 show in combination a third embodiment of the present invention. In this embodiment, a reinforcing member 76 does not serve as a door hinge reinforcing member and therefore partially differs from the door hinge reinforcing member 50 in the first embodiment. The configurations of the other members are biasically the same as those in the first embodiment. In addition, the connection relationship between the members is basically the same as that in the first embodiment except for the reinforcing member 76 whose connection relationship with other members partially differs from that in the first embodiment because of the partially modified configuration of the reinforcing member 76. In FIG. 7, only the reference numerals which generally denote respective members are shown except for the essential part of this embodiment in which it differs from the first embodiment, and the reference numerals for the details are not shown.

The reinforcing member 76 in this embodiment has a twisted flat side portion 56. The side portion 56 has no door hinge mounting bore 58 which are provided in the side portion 56 in the first embodiment. The front and rear end portions of the side portion 56 respectively correspond to the side front flange 50C and the side rear flange 50D in the first embodiment, and the positional relationship of these end portions with the horizontal portion 52 is the same as that of the flanges 50C and 50D.

Since the side portion 56 of the reinforcing member 76 has no raised portion which is provided in the first embodiment, the side portion 56 is not in contact with the reverse surface of the door hinge mounting portion 34 of the front pillar outer 32 as shown in FIG. 8 (a sectional view corresponding to FIG. 4) and FIG. 9 (a sectional view corresponding to FIG. 5).

Although the reinforcing member 76 in this embodiment does not serve as a door hinge reinforcing member, the rigidity of bond between the front pillar and the cowl, the torsional rigidity of the vehicle body and the torsional rigidity of the front pillar are improved by a large margin.

FIGS. 10 to 15 show in combination a fourth embodiment of the present invention. This embodiment differs from the first embodiment mainly in that the door hinge reinforcing member in the first embodiment extends in the lateral direction of the vehicle body whereas the door hinge reinforcing member in this embodiment extends in the longitudinal direction, and this makes the connection relationship thereof with other members different from that in the first embodiment. Accordingly, in FIGS. 10 to 15 also, the same members or portions as those in the first embodiment are denoted by the same reference numerals, and detailed description thereof is omitted.

Figure 11:
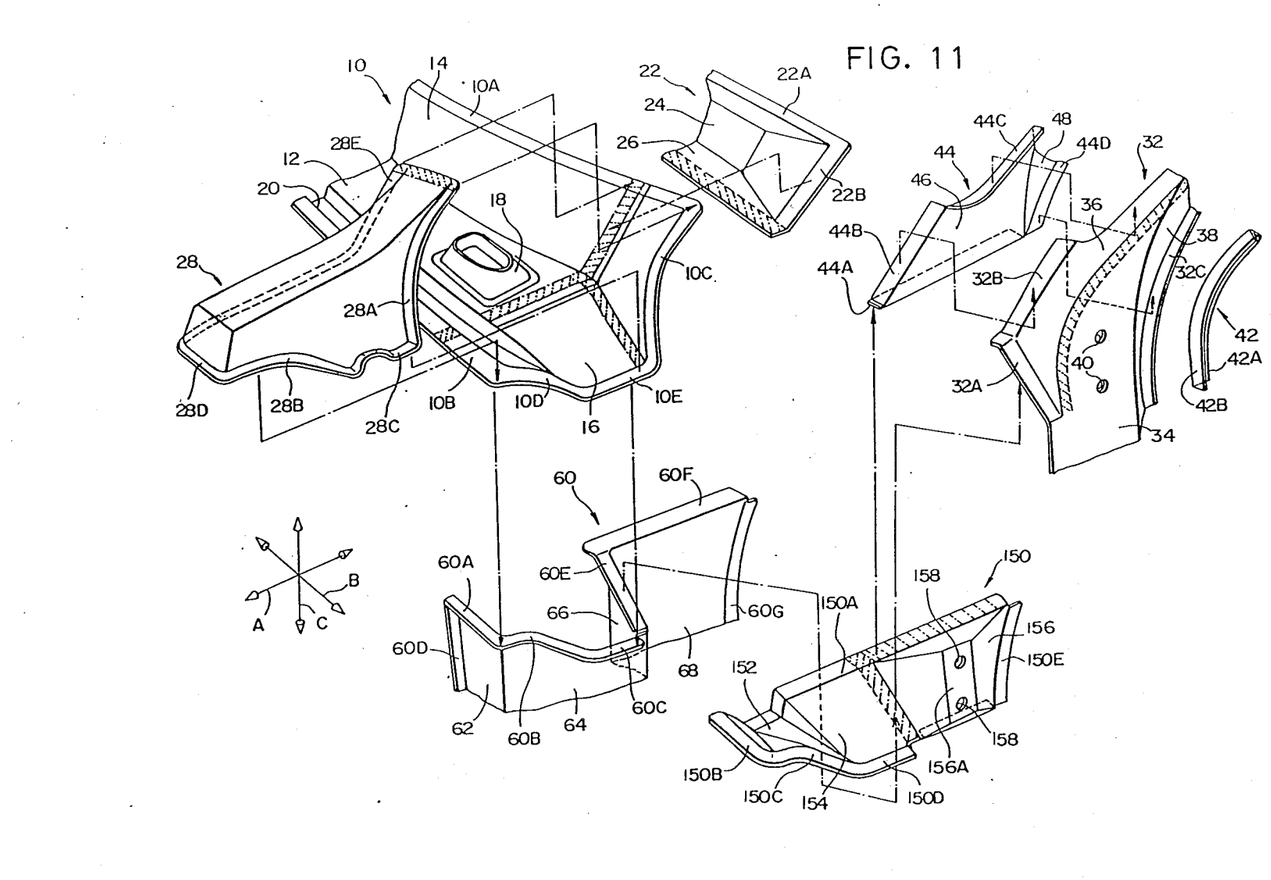
FIG. 11 is an exploded perspective view of the joint portion.
Figure 12:
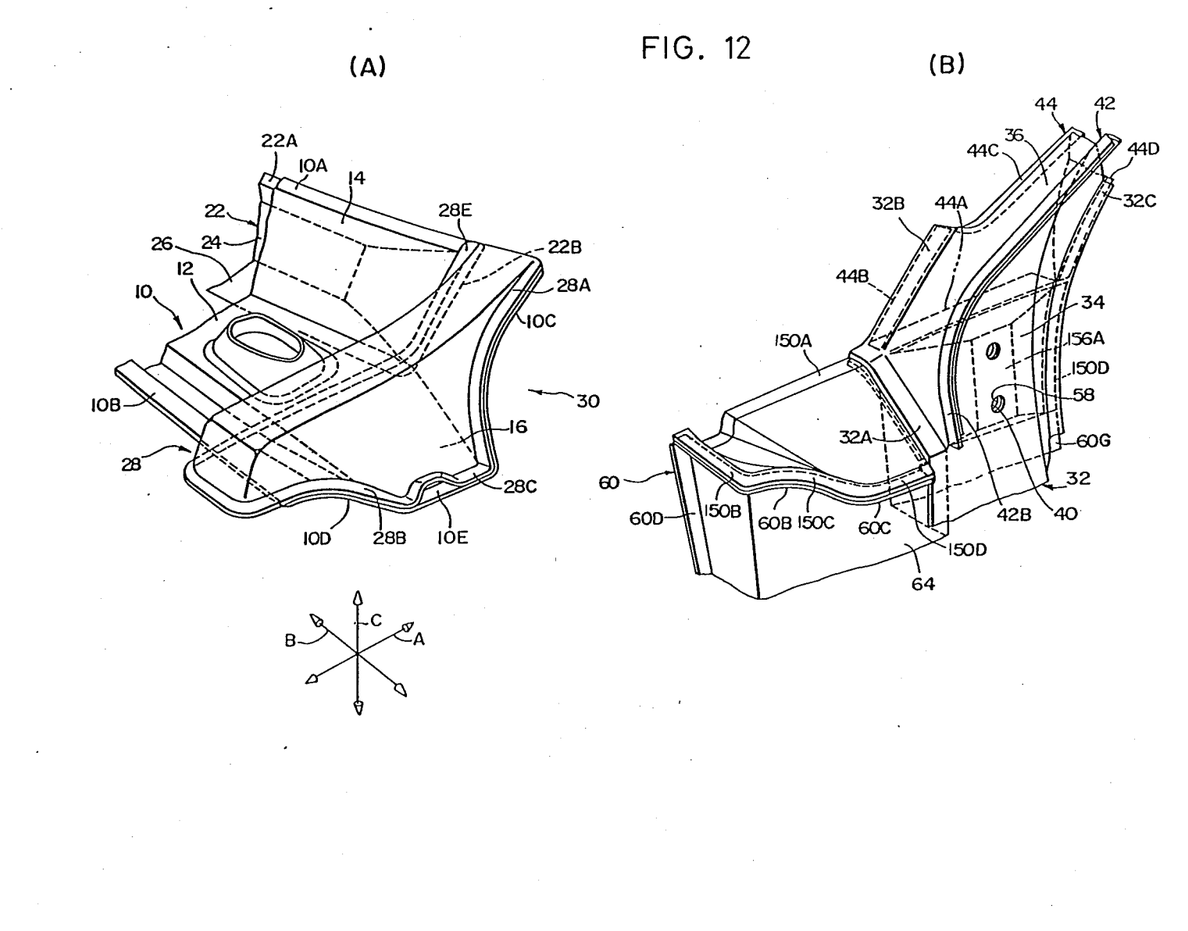
FIGS. 12(A) and 12(B) are perspective views showing the external appearance of the joint portion before the final assembly.

As shown in FIG. 11, the door hinge reinforcing member 150 in this embodiment has a horizontal portion 152 provided at the end thereof which is closer to the front end of the vehicle body, a slanting portion 154 which extends outwardly in the lateral direction of the vehicle body so as to define a down-grade, and a side portion 156 which is raised in such a manner that the top 156A defines a substantially vertical plane. Door hinge mounting bores 158 are provided in the top 156A. Weld nuts 59 (see FIGS. 13 and 14) are rigidly secured to the reverse surface of the top 156A so as to be concentrical with the hinge mounting bores 158, respectively.

Along the periphery of the door hinge reinforcing member 150 are formed a side inner flange 150A provided at the inner end in the lateral direction of the vehicle body so as to extend in the longitudinal direction of the vehicle body, a front flange 150B which is continuous with the side inner flange 150A, a side front flange 150C which is continuous with the front flange 150B and which extends downwardly while convexly bending toward the rear end of the vehicle body, a side rear flange 150D which is continuous with the side front flange 150C, and a rear end flange 150E provided at the rear end of the door hinge reinforcing member 150.

The door hinge reinforcing member 150 is connected to the front pillar inner 44 in such a manner that the rear portion (the portion shown by the parallel diagonal chain lines in FIG. 11) of the side inner flange 150A is welded to the reverse surface of the lower flange 44A of the front pillar inner 44 as shown in FIG. 12(B). A portion of the slanting portion 154 which is adjacent to the side portion 156 and a portion (the portions shown by the parallel diagonal chain lines in FIG. 11) are respectively welded to the reverse surface of the front flange 32A of the front pillar outer 32 and the reverse surface of the joint between the front flange 32A and the upper flange 32B as shown in FIG. 12(B). The rear end flange 150E is welded to the reverse surface of the lower flange 32C of the front pillar outer 32. The top 156A is brought into contact with the reverse surface of the door hinge mounting portion 34, and the door hinge mounting bores 158 are respectively aligned with the door hinge mounting bores 40 provided in the front pillar outer 32.

The cowl side panel 60, which is substantially the same as that in the first embodiment, is connected to the door hinge reinforcing member 150 in such a manner that, as shown in FIG. 12(B), the central flange 60E is welded to the reverse surface of a portion (the portion shown by the parallel diagonal chain lines in FIG. 11) of the slanting portion 154 of the door hinge reinforcing member 150 which is adjacent to the side portion 156, and the side rear flange 60F is welded to the reverse surface of a rear portion (the portion shown by the parallel diagonal chain lines in FIG. 11) of the side inner flange 150A of the door hinge reinforcing member 150.

Further, the front flange 60A, the side front flange 60B and the side central flange 60C of the cowl side panel 60 are respectively welded to the reverse surfaces of the front flange 150B, the side front flange 150C and the side rear flange 150D of the door hinge reinforcing member 150. In addition, the rear end flange 60G of the cowl side panel 60 is welded to the reverse surface of the rear end flange 150E of the door hinge reinforcing member 150. Thus, the cowl side panel 60 cooperates with the front pillar outer 32 to define a space having a closed section with the door hinge reinforcing member 150 interposed therebetween.

The cowl subassembly 30 shown in FIG. 12(A) is connected to the door hinge reinforcing member 150 in such a manner that the reverse surface of the side central flange 10E of the cowl inner 10 is welded to the side central flange 150D of the door hinge reinforcing member 150, while the reverse surface of the side front flange 10D of the cowl inner 10 is welded to the side front flange 150C of the door hinge reinforcing member 150, and the reverse surface of the front flange 10B of the cowl inner 10 is welded to the front flange 150B of the door hinge reinforcing member 150.

Further, the reverse surface of a portion (the portion shown by the parallel diagonal chain lines in FIG. 11) of the horizontal portion 12 of the cowl inner 10 which is adjacent to the slanting portion 16 is welded to a front portion of the side inner flange 150A (the portion thereof in which no parallel diagonal chain lines are shown in FIG. 11) and the joint between the front and upper flanges 32A and 32B of the front pillar outer 32. The reverse surface of a portion (the portion shown by the parallel diagonal chain lines in FIG. 11) of the slanting portion 16 of the cowl inner 10 which is adjacent to the rising portion 14 is welded to the front flange 32A of the cowl outer panel 32, and the reverse surface of the side flange 22B of the cowl inner reinforcing member 22 is welded to the upper flange 32B of the front pillar outer 32.

Figure 10:
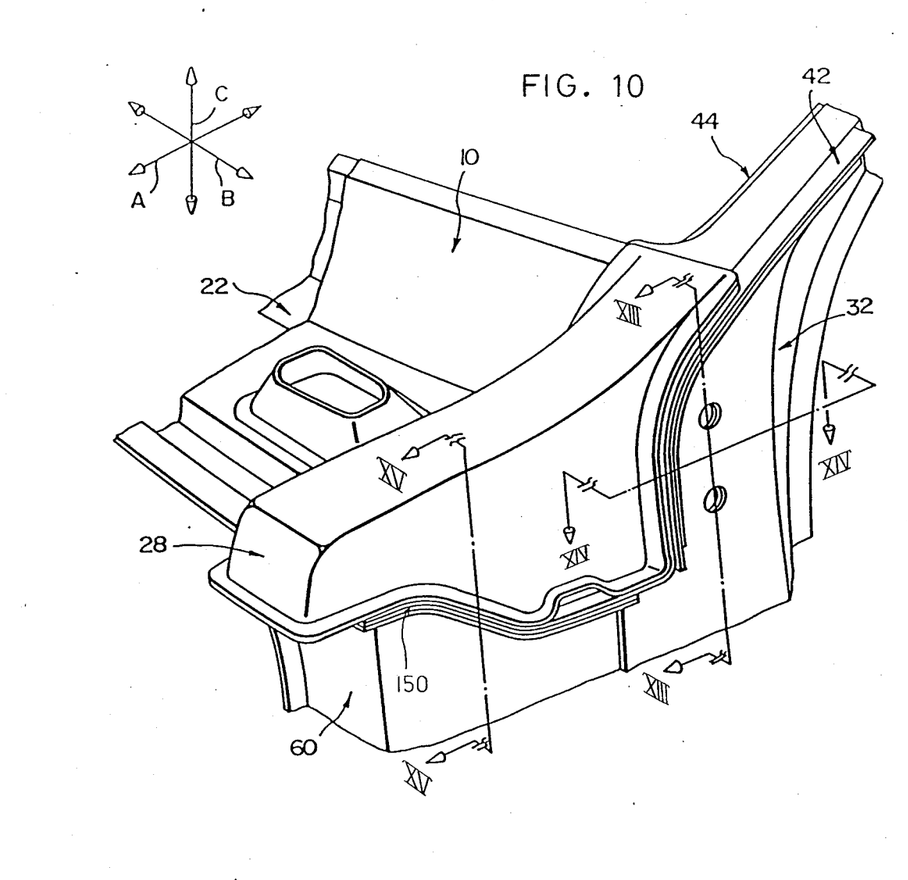
FIG. 10 is a perspective view showing the external appearance of the joint portion.
Figure 13:
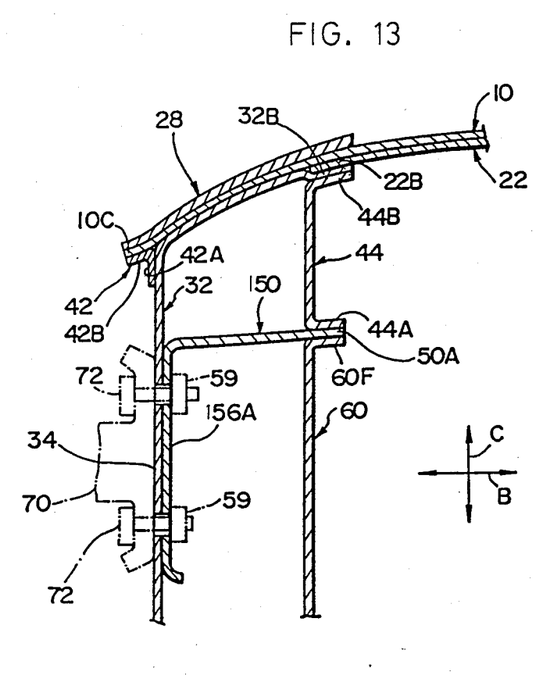
FIG. 13 is a sectional view taken along the line XIII—XIII in FIG. 10.
Figure 14:
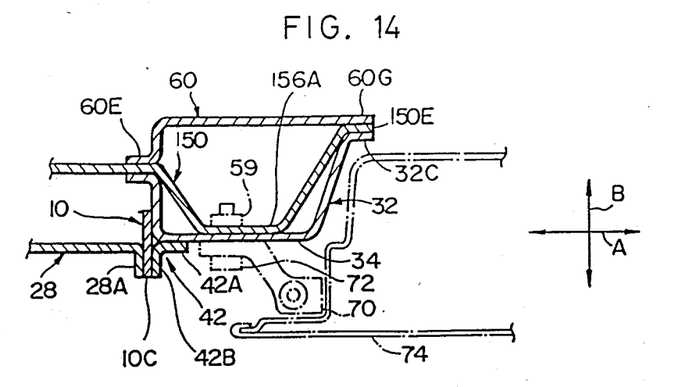
FIG. 14 is a sectional view taken along the line XIV—XIV in FIG. 10.
Figure 15:
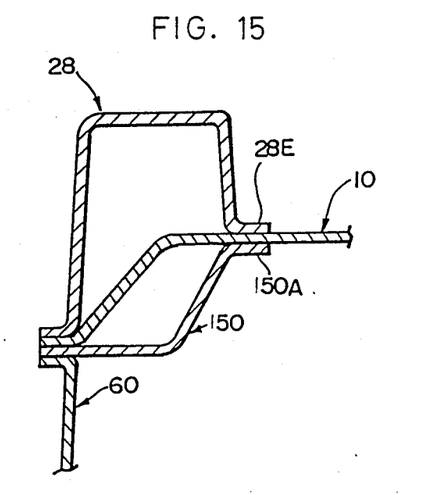
FIG. 15 is a sectional view taken along the line XV—XV in FIG. 10.

Similarly to the first embodiment, the reverse surface of the side rear flange 10C of the cowl inner 10 is, as shown in FIGS. 13 and 14, welded to the other surface 42B of the roof drip channel 42, thereby forming a cowl and front pillar connecting structure such as that shown in FIG. 10. Thus, a space having a closed section is defined between the cowl inner 10 and the door hinge reinforcing member 150 as shown in FIG. 15.

In the fourth embodiment arranged as detailed above, the front pillar outer 32 and the front pillar inner 44 cooperate with each other to define the upper portion of the front pillar having a closed section, and the front pillar outer 32 and the cowl side panel 60 cooperate with each other to define the lower portion of the front pillar having a closed section, as shown in FIG. 13 and in a manner similar to that in the first embodiment. The door hinge reinforcing member 150 is positioned between the upper and lower portions of the front pillar in such a manner as to cross the space inside the pillar, thus serving as a bulkhead which partitions the upper and lower portions of the front pillar. Unlike the door hinge reinforcing member 50 in the first embodiment, the door hinge reinforcing member 150 in this embodiment extends forwardly from the joint between the same and the front pillar, but the reinforcing member 150 is connected at the other end thereof to the cowl subassembly 30 through the roof drip channel 42 in a manner similar to that in the first embodiment. On the front side of the door hinge reinforcing member 150, the door hinge reinforcing member 150 and the cowl inner 10 cooperate with each other to define a space having a closed section, and the cowl inner 10 and the cowl side reinforcing member 28 cooperate with each other to define a space having a closed section.

Accordingly, the front pillar and the cowl are connected together at a multiplicity of positions and over relatively wide areas through the door hinge reinforcing member 150 and the roof drip channel 42. Therefore, the rigidity of bond between the front pillar and the cowl is extremely high, and the torsional rigidity of the vehicle body is also improved. In this embodiment particularly, a space with a closed section is formed at the joint between the front pillar and the cowl. Therefore, the flexural rigidity of the vehicle body is greatly improved. Accordingly, it is possible to obtain various advantages such as improvements in the vehicle body vibration characteristics.

In addition, since the door hinge reinforcing member 150 is disposed so as to cross the space inside the front pillar and connected to the cowl, the torsional rigidity of the front pillar is greatly improved, and the rigidity of the door hinge mounting portion is also improved, whereby the cross-sectional deformation of the front pillar is prevented, and lowering of the door is thereby prevented in the same manner as that in the case of the first embodiment.

It will be apparent to those skilled in the art from the gist of the present invention that it is possible to obtain a modification of the fourth embodiment which is similar to the third embodiment in which the reinforcing member connected to the front pillar and the cowl does not serve as a door hinge reinforcing member.

What is claimed is:

1. A structure for connecting front pillars and a cowl in a vehicle, comprising:
a cowl assembly extending in the lateral direction of the vehicle;
a pair of cowl side panels connected to said cowl assembly at opposite lateral ends of the vehicle;
a pair of front pillar assemblies provided at opposite lateral ends of the vehicle such that each front pillar assembly is connected to the corresonding cowl side panel, each front pillar assembly comprising an outer member and an inner member with respect to the lateral direction of the vehicle, said outer member, said inner member and the corresponding cowl side panel defining an enclosed space; and
reinforcing means associated with each of said front pillar assemblies, said reinforcing means being rigidly secured to the outer member and the inner member of the corresponding front pillar assembly and being interposed between the inner member of the front pillar assembly and the corresponding cowl side panel such that said reinforcing means extends into said enclosed space.

2. A connecting structure according to claim 1, wherein said reinforcing means has an extending portion which extends inwardly in the lateral direction of the vehicle while crossing the inner member of the corresponding front pillar assembly, said extending portion being rigidly secured to said cowl assembly.

3. A connecting structure according to claim 1, wherein said reinforcing means has an extending portion which extends toward the front end of the vehile while crossing the corresponding front pillar assembly, said extending portion being rigidly secured to both the corresponding cowl side panel and said cowl assembly.

4. A connecting structure according to claim 1, wherein said reinforcing means is a door hinge reinforcing member which is rigidly secured to the inner surface of the outer member of the corresponding front pillar assembly so as to reinforce the structure for securing a hinge of a vehicle door to said outer member.

5. A connecting structure according to claim 1, wherein said cowl assembly comprises a cowl inner including a horizonal portion, a rising portion which rises from the end of said horizontal portion which is closer to the rear end of the vehicle while slanting rearwardly, and a pair of slanting portions respectively extending outwardly from both ends of said horizontal portion in the lateral direction of the vehicle while slanting downwardly.

6. A connecting structure according to claim 5, wherein each of said cowl side panels is rigidly secured to the lower surface of the outer edge of the corresponding slanting portion of said cowl inner and is also rigidly secured to the lower edge of the inner member of the corresponding front pillar assembldy, whereby said front pillar assemblies and said cowl assembly are connected together.

7. A connecting structure according to claim 6, wherein said reinforcing means has an extending portion integral therewith which extends inwardly in the lateral direction of the vehicle while crossing the inner member of the corresponding front pillar assembly, said extending portion being bonded to the reverse surface of the rising portion of said cowl inner.

8. A connecting structure according to claim 7, further comprising:
a cowl inner reinforcing member bonded directly to the reverse surface of the rising portion of said cowl inner, said extending portion being bonded to the reverse surface of said cowl inner reinforcing member.

9. A connecting structure according to claim 6, wherein said reinforcing means has an extending portion which integrally extends from the corresponding front pillar assembly toward the front end of the vehicle, said extending portion being interposed and bonded between the corresponding cowl side panel and the lower surface of the outer edge of the corresponding slanting portion of said cowl inner.

10. A connecting structure according to claim 6, wherein said reinforcing means has a raised portion which is bonded to the inner surface of the outer member of the corresponding front pillar assembly, and a hinge of a vehicle door is rigidly secured at a position at which said raised portion is bonded to the inner surafce of said outer member, whereby said reinforcing means functions as a door hinge reinforcing member.

11. A connecting structure according to claim 10, wherein said raised portion is clamped and thereby secured by the outer member of the corresponding front pillar assembly and the corresponding cowl side pannel at two ends thereof in the longitudinal direction of the vehicle.

12. A connecting structure according to claim 6, wherein the front portion of the outer member of each of said front pillar assemblies is bent inwardly in the lateral direction of the vehicle and bonded to the front portion of the corresponding inner member, so that said outer and inner members define a space having a closed section.

13. A connecting structure according to claim 12, wherein said reinforcing means partitions said space into upper and lower space portions.

14. A connecting structure according to claim 13, wherein the joint between the respective front portions of said outer and inner members which are bonded to each other is bonded to the reverse surface of the rising portion of said cowl inner.

15. A connecting structure according to claim 14, wherein each side edge of the rising portion of said cowl inner is bonded to the outer surface of the outer member of the corresponding front pillar assembly.

16. A structure for connecting front pillars and a cowl in a vehicle, comprising:
- a cowl inner extending in the lateral direction of the vehicle and having a horizontal portion, a rising portion rising from the end of said horizontal portion which is closer to the rear end of the vehicle while slanting rearwardly, and a pair of slanting portions respectively extending outwardly from two ends of said horizontal portion in the lateral direction of the vehicle while slanting downwardly;
- a pair of cowl side panels each rigidly secured to the lower surface of the outer edge of the corresponding slanting portion of said cowl inner and extending toward the rear end of the vehicle;
- a pair of front pillar assemblies provided so as to stand at opposite lateral ends of the vehicle and each having an outer member and an inner member with respect to the lateral direction of the vehicle, the lower edge of said inner member being rigidly secured to a portion of the corresponding cowl side panel which extends toward the rear end of the vehicle, and the front portion of said outer member being bent inwardly in the lateral direction of the vehicle so as to be connected to said inner member and bonded to the reverse surface of the rising portion of said cowl inner; and
- a reinforcing member rigidly secured to the outer and inner members of each of said front pillar assemblies so as to extend into an enclosed space defined between said outer and inner members.

* * * * *